US008862511B2

(12) United States Patent
Ralev (10) Patent No.: US 8,862,511 B2
(45) Date of Patent: Oct. 14, 2014

(54) PROVIDING AUDIO-BASED FINANCIAL ASSET INFORMATION

(75) Inventor: Vladimir Angelov Ralev, Bourgas (BG)

(73) Assignee: Red Hat, Inc., Raleigh, NC (US)

(*) Notice: Subject to any disclaimer, the term of this patent is extended or adjusted under 35 U.S.C. 154(b) by 655 days.

(21) Appl. No.: 12/392,916

(22) Filed: Feb. 25, 2009

(65) Prior Publication Data

US 2010/0217700 A1 Aug. 26, 2010

(51) Int. Cl.
| | |
|---|---|
| *G06Q 40/00* | (2012.01) |
| *H04M 3/487* | (2006.01) |
| *H04L 12/18* | (2006.01) |
| *G06Q 40/06* | (2012.01) |
| *H04L 29/08* | (2006.01) |
| *G06Q 40/02* | (2012.01) |
| *G06Q 40/04* | (2012.01) |
| *H04L 12/58* | (2006.01) |

(52) U.S. Cl.
CPC ......... *G06Q 40/06* (2013.01); *H04M 2201/18* (2013.01); *H04L 67/26* (2013.01); *H04M 3/4872* (2013.01); *H04L 12/1895* (2013.01); *H04L 12/1859* (2013.01); *G06Q 40/00* (2013.01); *G06Q 40/02* (2013.01); *G06Q 40/04* (2013.01); *H04L 12/587* (2013.01)
USPC .............. 705/35; 705/36 R; 705/37; 705/42

(58) Field of Classification Search
CPC ....... G06Q 40/00; G06Q 40/06; G06Q 40/02; G06Q 40/04; H04L 12/1859; H04L 12/1895; H04L 12/587
USPC ...................................... 705/35, 36 R, 37, 42
See application file for complete search history.

(56) References Cited

U.S. PATENT DOCUMENTS

| | | | | |
|---|---|---|---|---|
| 6,639,614 | B1* | 10/2003 | Kosslyn et al. | 715/837 |
| 7,228,289 | B2* | 6/2007 | Brumfield et al. | 705/35 |
| 7,552,396 | B1* | 6/2009 | Bicheno et al. | 715/766 |
| 7,596,523 | B2* | 9/2009 | Sobel et al. | 705/36 R |
| 8,612,582 | B2* | 12/2013 | Dare et al. | 709/224 |
| 8,615,581 | B2* | 12/2013 | Dare et al. | 709/224 |
| 8,650,290 | B2* | 2/2014 | Dare et al. | 709/224 |
| 8,745,213 | B2* | 6/2014 | Dare et al. | 709/224 |
| 2002/0026404 | A1* | 2/2002 | Thompson | 705/37 |
| 2002/0152144 | A1* | 10/2002 | Kamper et al. | 705/35 |
| 2003/0078865 | A1* | 4/2003 | Lee | 705/35 |
| 2004/0117292 | A1* | 6/2004 | Brumfield et al. | 705/37 |
| 2006/0026088 | A1* | 2/2006 | Grossman et al. | 705/37 |

(Continued)

OTHER PUBLICATIONS

Sisk, M. (2003). Multi-Channel Integration: Where every doors the same. Bank Technology News, 16(4), 28-28,37. Retrieved Jun. 3, 2014.*

(Continued)

*Primary Examiner* — Kito R Robinson
(74) *Attorney, Agent, or Firm* — Lowenstein Sandler LLP (57) ABSTRACT

In one embodiment, a mechanism for providing real-time audio-based financial asset information is disclosed. In one embodiment, a method includes receiving a trigger event related to a financial asset from a computer of a user of a financial asset information system while the user is away from the computer, contacting the user via a phone call, and playing an audio signal to the user where a change in sound volume of the audio signal correlates to a deviation of the financial asset from the trigger event.

16 Claims, 4 Drawing Sheets

(56) References Cited

U.S. PATENT DOCUMENTS

| | | | |
|---|---|---|---|
| 2006/0195816 A1* | 8/2006 | Grandcolas et al. | 717/101 |
| 2006/0247995 A1* | 11/2006 | Childs et al. | 705/35 |
| 2007/0061266 A1* | 3/2007 | Moore et al. | 705/51 |
| 2011/0106589 A1* | 5/2011 | Blomberg et al. | 705/7.39 |

OTHER PUBLICATIONS

Alert services give firms lots of choices ; financial insights takes a look at trends and vendors. (2004). Bank Technology News, 17(3), 12. Retrieved Jun. 3, 2014.*

* cited by examiner

PROVIDING AUDIO-BASED FINANCIAL ASSET INFORMATION

TECHNICAL FIELD

The embodiments of the invention relate generally to communication platforms and, more specifically, relate to a mechanism for providing real-time audio-based financial asset information.

BACKGROUND

With the continued progress of globalization, more corporations than ever before have work groups spread across countries and continents around the world. To support and increase the productivity of remote and telecommuting work groups, communications companies are considering more cost-effective network solutions that combine voice, wireless, data and video functionality. Businesses like these expect that the services they select and eventually implement will have call quality comparable to conventional telephone service, and they expect those services to boost productivity and reduce overall communications costs. Acquiring these desired network services requires connections from the Internet and wireless and wireline networks to Public Switched Telephone Networks (PSTNs) using a flexible, robust, scalable, and cost-effective media gateway. The ability of such media gateways to reduce overall communications costs for dispersed workgroups forms the foundation for media services and servers.

For integrated communication applications, such as those described above, server support needs to be provided. Media gateways provide the ability to switch voice media between a network and its access point. Using Digital Subscriber Line (DSL) and fast-Internet cable technology, a media gateway converts, compresses, and packetizes voice data for transmission back-and-forth across the Internet backbone for wireline and wireless phones. Media gateways sit at the intersection of the PSTNs and wireless or IP-based networks. One way for service providers to speed up their innovation processes and quickly launch new services is if they use a standards-based component model and container architecture, such as a Java™ based communications platform.

Today, all communications can be routed through computers. Widespread access to broadband Internet and the ubiquity of Internet Protocol (IP) enable the convergence of voice, data and video. This convergence allows many beneficial applications to be deployed via software-based media servers. One area that could benefit from converged voice, data, and video applications on software-based media servers is trading of financial assets.

Currently, there is a need to provide a way to indicate to a user (e.g., a trader) of a financial asset system the real-time price of a financial asset. The price of a financial asset is a curve going up or down over time. On most modern markets these changes are very rapid and the price changes every second or even faster. For example, traders may utilize computers to track current price information. However, they do not have to watch the computer at all times, because the computers are instructed to trigger alerts on important events when they need attention. When such an event occurs the trader has to look at the screen for a few seconds to figure out what's going on before executing a buy or sell.

However, when a user of a financial asset system does not have access to a computer, they need access to another means to obtain the most up-to-date information in order to make effective decisions. Currently, the problem with many financial asset systems that report financial asset information via means other than computers is that they have a time lag in reporting the information or they report the information but cannot keep continuously conveying updated information in an effective way.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for real-time audio-based financial asset information. In one embodiment, a method for providing real-time audio-based financial asset information includes receiving a trigger event related to a financial asset from a computer of a user of a financial asset information system while the user is away from the computer, contacting the user via a phone call, and playing an audio signal to the user where a change in sound volume of the audio signal correlates to a deviation of the financial asset from the trigger event.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of the invention provide real-time audio-based financial asset information. Embodiments of the invention provide the capability to communicate real-time information regarding a financial asset, such as a current price of a stock, via an audio signal to a user of a financial asset information system. In one embodiment, an application to provide the real-time audio-based financial asset information is deployed as an endpoint in a media server. This real-time financial information endpoint may be integrated with a financial trading platform that acts as the source of the financial information that is conveyed by the endpoint.

Figure 1:
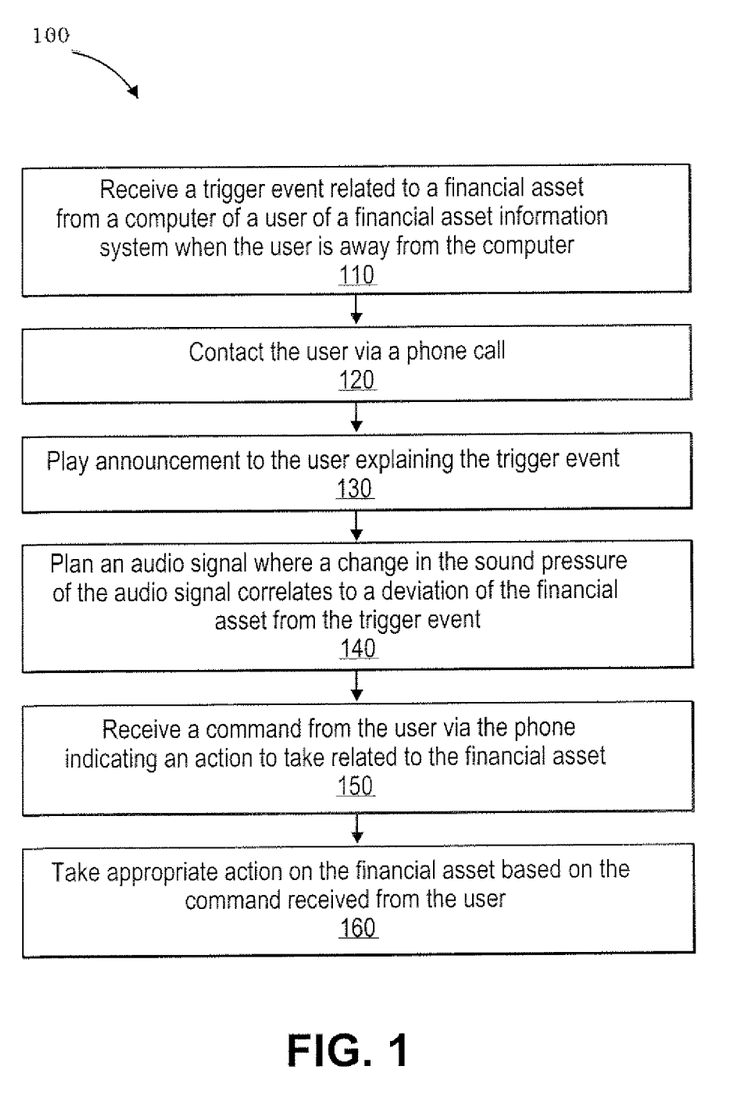
FIG. 1 is a flow diagram illustrating a method for providing real-time audio-based financial information according to an embodiment of the invention.

FIG. 1 is a flow diagram illustrating a method 100 for providing real-time audio-based financial asset information according to an embodiment of the invention. Method 100 may be performed by processing logic that may comprise hardware (e.g., circuitry, dedicated logic, programmable logic, microcode, etc.), software (such as instructions run on a processing device), or a combination thereof. In one embodiment, method 100 may be performed by real-time financial information endpoint 250 described with respect to FIG. 2.

Method 100 begins at block 110, where a trigger event related to a financial asset is received from a computer of a user of a financial asset information system when the user is away from the computer. In one embodiment, the trigger event may be when a stock price was reached a sell point specified by the user of the financial asset information system. In one embodiment, a real-time financial information endpoint in a media server receives and processes the trigger point. The real-time financial information endpoint may be integrated with a financial trading platform that acts as the source of the financial information that is conveyed by the endpoint. However, any computing device with a communications connection may be capable of performing embodiments of the invention, and embodiments are not solely limited to an endpoint in a media server.

Then, at block 120, the user is contacted via a phone call. In one embodiment, a communications interface may manage the phone call to the user. In one embodiment, the communications interface may be JSR-309, a Media Server Control Application Programming Interface (API) of the JAVA Community Process$^{SM}$ Program. JSR-309 provides a portable interface to create media rich applications with IVR, Conferencing, Speech Recognition, and similar features. However, it is envisioned that other interfaces for the communications interface are also possible to implement. In turn, the Media Server is connected to the phone of the user via the phone network (PSTN or other).

At block 130, an announcement is played to the user explaining the trigger event. In one embodiment, an Interactive Voice Response (IVR) endpoint of the Media Server may be responsible for generating the announcement. For example, the announcement may state that the stock price has reached a sell point specified by the user.

Then, an audio signal is played to the user at block 140. In one embodiment, the audio signal is generated by a signal generator of the Media Server. In embodiments of the invention, a variance in sound volume of the audio signal correlates to any deviation in the financial asset information from the specified trigger event of the financial asset information. An increase in sound volume may indicate a positive deviation from the trigger event, while a decrease in sound volume may indicate a negative deviation from the trigger event. Based on the change in sound volume, the user will perceive a change in the loudness of the signal which provides information to the user regarding the respective deviation from the base point. As a result, the user will have the most recent real-time information about changes in the financial asset while making his or her decision on how to proceed.

In another embodiment, the audio signal may change in frequency to indicate deviations from the trigger event. The change in frequency may be coupled with the change in sound volume to provide additional information about the financial asset. In yet another embodiment, the signal may be either of a continuous tone or a series of intermittent tones. If a series of intermittent tones are utilized, the time interval length between consecutive tones may be used to convey information about the financial asset, and vice versa.

In one embodiment, once the audio sound volume or frequency representing the deviation reaches a level beyond the limit noticeable to the human ear, an announcement may be played by the Media Server stating a new price to serve as the basis for the audio sound volume or frequency. The deviation of the audio signal volume or frequency from this initial reset point then indicates the deviation from the newly announced price. In addition, in some embodiments of the invention, the user may press a button (e.g., "1") to force the application to announce the price at any given moment and re-adjust the levels.

At block 150, a command is received from the user via the phone indicating an action to take related to the financial asset. For example, when the user decides to execute an action he or she may press a button on the phone to indicate their action. For example, 1 may mean "sell", 2 may mean "buy", 3 may mean "ignore", and so on. Finally, at block 160, the appropriate action is taken related to the financial asset based on the command received from the user. In embodiments of the invention, the specific commands may vary based on the particular application and may be assigned by the user from his or her computer as part of the program settings.

Figure 2:
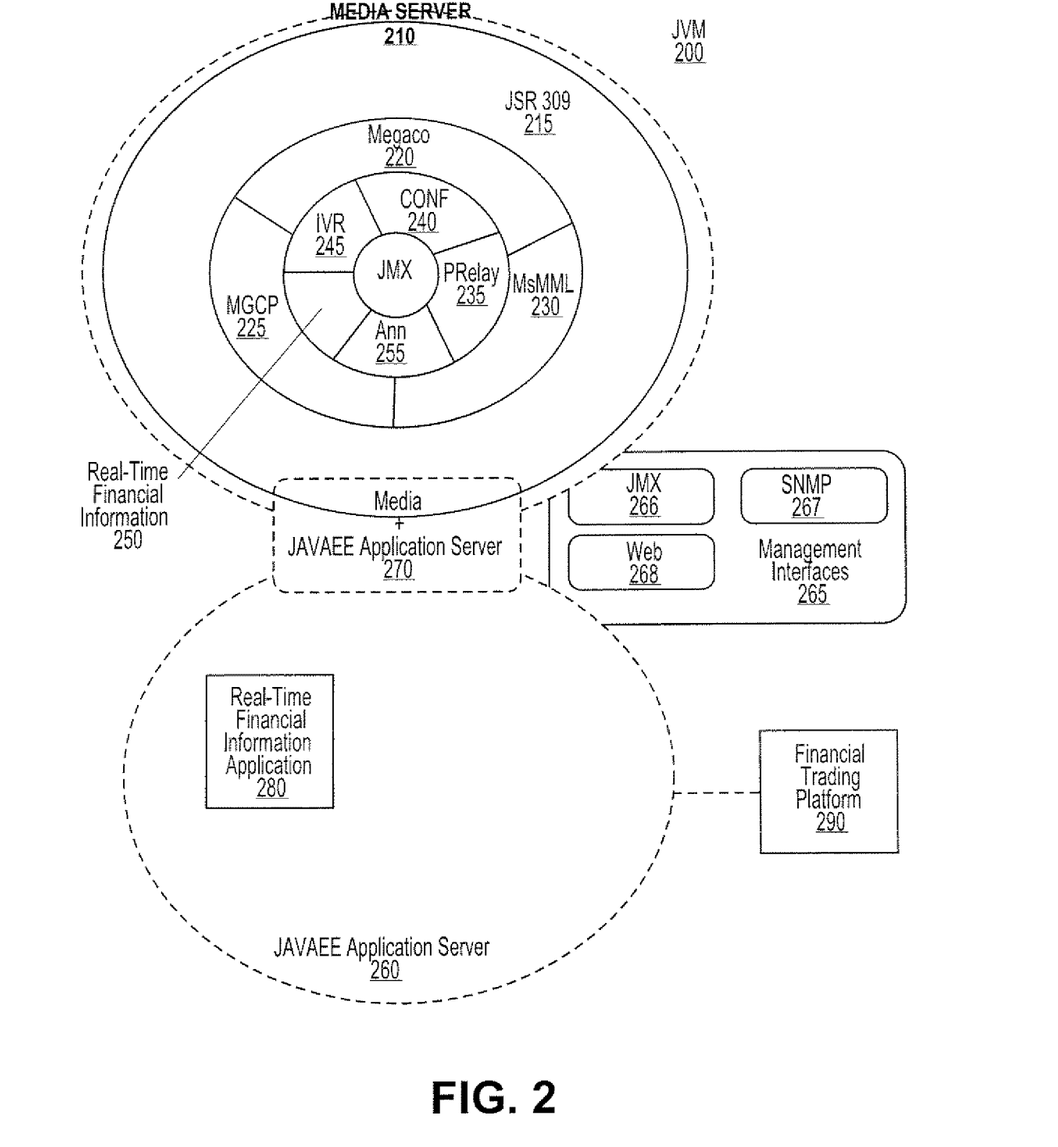
FIG. 2 is a block diagram of a Java™ virtual machine (JVM) with an integrated media and Java™ Enterprise Edition (JAVA EE) application server, where the media server includes a real-time financial information endpoint capable of performing embodiments of the invention.

FIG. 2 is a block diagram of an integrated a media and JAVA Enterprise Edition (JAVA EE) server in a single JAVA Virtual Machine (JVM), where the media server includes a real-time financial information endpoint capable of performing embodiments of the invention. A JVM is a set of computer software programs and data structures that use a virtual machine model for the execution of other computer programs and servers. In one embodiment, JVM 200 and its associated components are implemented on one or more computing devices. JVM 200 enables the creation, deployment, and management of services and applications that integrate voice, video, and data. It also functions seamlessly across a range of Internet Protocol (IP) and communications networks, and can be accessed by computers, handsets, and other network-enabled devices.

JVM 200 includes an integrated media server and JAVA EE application server 270 and management interfaces 265 associated with the integrated application server 270. The integrated application server 270 combines a media server 210 with a JAVA EE application server 260 to enable the development, deployment and management of applications that integrated of voice, video and data across a range of networks and devices. Media server 210 facilitates applications in sending media across communications networks to devices.

The integrated media and JAVA EE application server 270 is a single integrated stack, with the media server 210 and JAVA EE 260 running in the same JVM 200. The integrated application server 270 further provides scalability via a flexible architecture for multiple topologies, data center scalability with local network protocol load balancing, and geographic scalability via DNS load balancing. The integrated application server 270 additionally provides development benefits, such as not limiting users to an exclusive choice of JAVA EE 260 or a media server 210, a continuous step-through debugging experience, a common microkernel architecture (e.g., JBOssMX™), and shared container building blocks (e.g., Java™ Naming and Directory Interface (JNDI), Java™ Management Extensions (JMX), Java™ Transaction API (JTA), Web Services, Aspect-Oriented Programming (AOP), etc).

It should be noted that media server 210 is not a JAVA EE specification. However, it utilizes many JAVA EE 260 components, like JMX and JNDI. JAVA EE 260 is an application building platform that provides many facilities that media server 210 uses. For example, some useful JAVA EE services and tools may include, but are not limited to, JBOss™ cache, JMX, Java™ Naming and Directory Interface (JNDI), JavaAssist™, and JBOss™ clustering.

The use of the modular JAVA EE architecture 260 with a media server 210 results in a simple and cleanly separable architecture for the implementation of embodiments of the invention. The JAVA EE microkernel architecture 260 is a natural fit for building the media server 210. The media server 210 may be a service in the JMX microkernel of JAVA EE 260. JMX is a Java™ technology that supplies tools for managing and monitoring applications, system objects, devices (e.g., printers), and service-oriented networks. Those resources are represented by objects called MBeans (for Managed Bean). In other embodiments, other similar frameworks may be utilized for the microkernel architecture of JAVA EE including Open Service Gateway initiative (OSGi), for example.

Management interfaces 265 provide third party application programming interfaces (APIs) 266, 267, 268 to the integrated media and JAVA EE application server 270. These third party APIs 266-268 simplify integrating with core business systems. For example, some of the management functions provides by management interfaces 265 may include, but are not limited to, full visibility for monitoring and management via JMX 266, internal system APIs (media server control API), and application APIs (service usage, service building blocks usage, event traffic control). Third party APIs also provide Operational/Business Support Systems (OSS/BSS) connectivity. For example, this may include remote JAVA EE connectivity. Some example APIs shown in FIG. 2 include the JMX API 266, a Simple Network Management Protocol (SNMP) API 267, and a Web API 268.

The media server 210 may be controlled by applications that are not in same JVM 200 as the media server 200 via industry-standard controllers. Such industry-standard controller may include, but are not limited to, MEGACO 220, Media Gateway Control Protocol (MGCP) 225, or Media Server Markup Language (MSML) 230. JSR-309 215 may be another industry standard used by applications to call the media server 210.

Typically, the media server 210 includes one or more endpoints 235, 240, 245, 250 and 255. An endpoint 235-255 is a source and/or sink of data that may be physical or virtual. Examples of physical endpoints are an interface to a gateway that terminates a trunk connected to a Public Switch Telephone Network (PSTN) switch, an interface to a gateway that terminates an analog Plain Old Telephone System (POTS) connection to a phone or a PBX, for instance. Examples of virtual endpoints are an Announcement endpoint 255 that plays an audio file for a user, a Packet Relay endpoint 235, which is a specific form of a conference bridge that usually supports just two connections, a Conference endpoint 240, which includes an Audio Mixer and is used for conference applications, and an IVR endpoint 245 that is used for recording, collecting, and generating dual tone multi-frequency (DTMF) signals and other tones.

In one embodiment, the media server 210 implements a real-time financial information endpoint 250. The real-time financial information endpoint 250 works in tandem with real-time financial information application 280 to provide the capability to communicate real-time information regarding a financial asset, such as a current price of a stock, via an audio signal to a user of the media server 210. The real-time financial information application 280 is deployed on the JAVA EE application server 260 and receives financial data. Based on the received financial data, the application 280 instructs the real-time financial information endpoint 250 to contact the user and play an audio signal corresponding to the deviation from a base trigger point. In one embodiment, the real-time financial endpoint 250 may also play an announcement to the user to explain a starting basis for the audio signal. In one embodiment, the real-time financial information endpoint 250 may be integrated with a financial trading platform 290 that acts as the source of the financial information that is conveyed by the endpoint 250. In one embodiment, the communication interface utilized between the application 280 and the Media Server 210 is JSR-309 215. The Media Server 210 is, in turn, connected to a phone of the user via a phone network (e.g., PSTN or other telecommunications network).

In one embodiment, the real-time financial information endpoint 250 uses a signal generator (not shown) of the media server 210 to generate the audio signal played to the user. The endpoint 250 may be controlled by the real-time financial information application 280 to generate the audio signal with the required properties via the JSR-309 215 interface. For voice announcements and detection of key presses, the real-time financial information endpoint 250 may utilize the IVR endpoint 245. The media server 210 allows switching between endpoints while the call is active. In one embodiment, the announcement is made possible by a TextToSpeech module in IVR endpoint 245.

In one embodiment, the real-time financial information endpoint 250 varies the sound volume of the audio signal to convey a change in the financial asset information from a specified base point of the financial asset information. An increase in sound volume may indicate a positive deviation from the base point, while a decrease in sound volume may indicate a negative deviation from the base point. Based on the change in sound volume, the user will perceive a change in the loudness of the signal which provides information to the user regarding the respective deviation from the base point.

In another embodiment, the real-time financial information endpoint 250 may utilize changes in frequency of the signal to indicate deviations from a base point. In some embodiments, the change in frequency may be coupled with the change in sound volume to provide additional information about the financial asset. In yet another embodiment, the audio signal may be a continuous tone or a series of intermittent tones. If the real-time financial information endpoint 250 utilizes a series of intermittent tones, the length of time interval between consecutive tones may be used to convey information about the financial asset, and vice versa.

When the user makes a decision based on the information conveyed in the audio signal from the real-time financial information endpoint 250, he or she may communicate this decision to the real-time financial information endpoint 250 by pressing a button on the phone, for example 1 means "sell", 2 means "buy", 3 means "ignore", and so on. This action is detected by the real-time financial information endpoint 250 which, in turn, takes the corresponding action. The specific commands may vary based on the specific application and may be assigned by the trader from his computer as part of the program settings.

Figure 3:
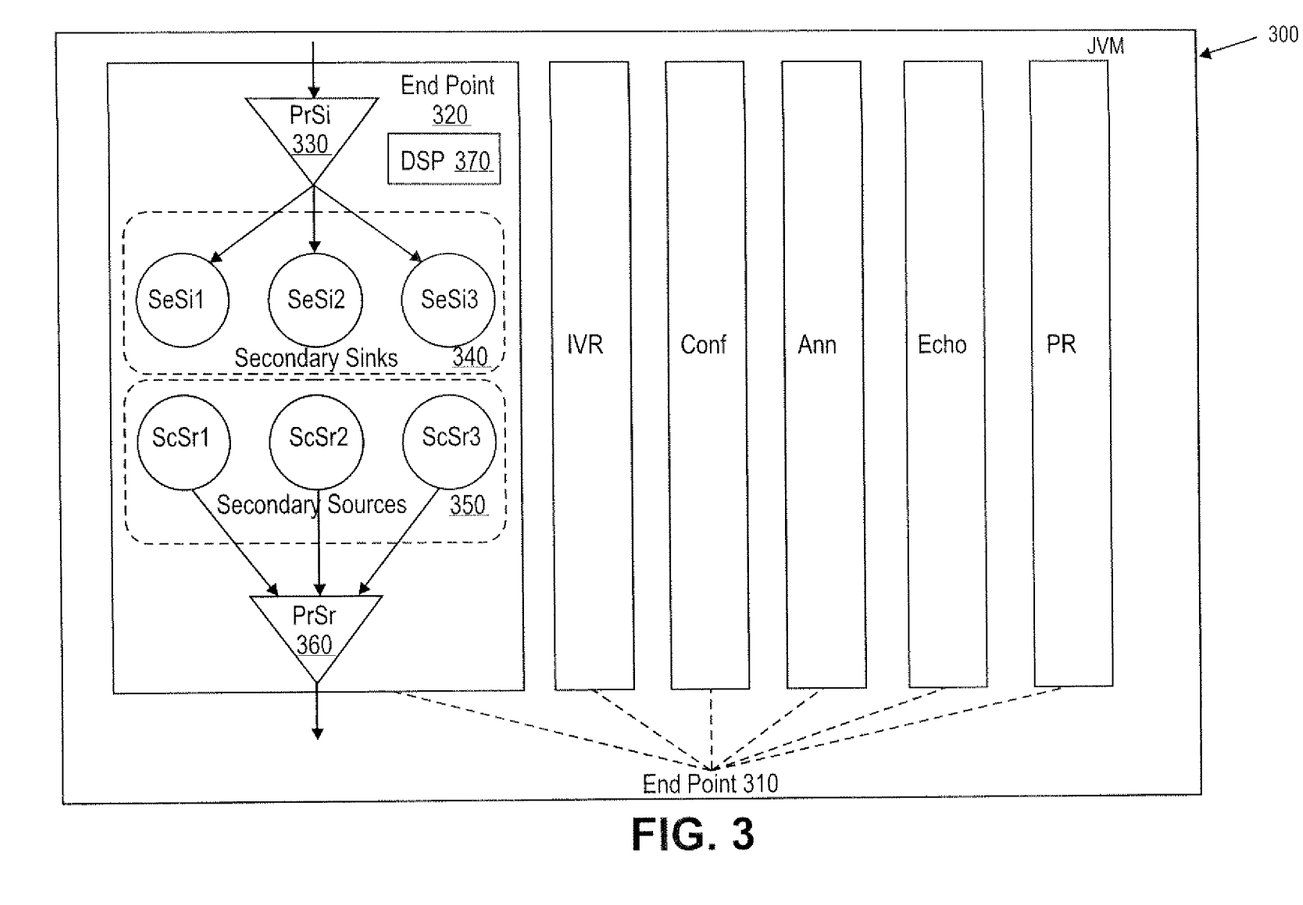
FIG. 3 is a block diagram illustrating a media server architecture with a real-time financial information endpoint according to an embodiment of the invention.

FIG. 3 is a block diagram illustrating a media server architecture 300 with a real-time financial information endpoint according to an embodiment of the invention. In one embodiment, media server 300 is the same as media server 210 described with respect to FIG. 2. In addition, real-time financial information endpoint 310 is the same as real-time financial information endpoint 250 described with respect to FIG. 2.

The media server architecture 300 consists of endpoints 310. As discussed previously, the endpoints 310 may be physical or virtual endpoints. Some examples of endpoints 310 include T1 lines, E1 lines, Time-Division Multiplexing (TDM) lines, fax lines, IVR, Announcement, Conference, Packet Relay, and Real-Time Financial Information, to name a few examples. In one embodiment, the endpoints 310 may be implemented as JMX MBeans.

As illustrated in FIG. 3, there are five main areas within an endpoint 310, as shown in blown-up form in endpoint 320: primary sink 330, secondary sinks 340, primary source 360, secondary sources 350, and Digital Signal Processing (DSP) logic 370. Each endpoint 310, 320 has a primary source 360 and many secondary sources 350. Also, each endpoint 310, 320 has a primary Sink 330 and many secondary sinks 340. Within the endpoint 310, 320, the primary source 360 acts as single point of media stream producer to a sink outside of endpoint (not shown) and many secondary sources 350 contribute the media to this primary source 360. Additionally, within the endpoint 310, 320, the primary sink 330 acts as single point of media stream consumer from a source (not shown) outside of the endpoint 310, 320 and many secondary sinks 340 consume the media from the primary sink 330.

Figure 4:
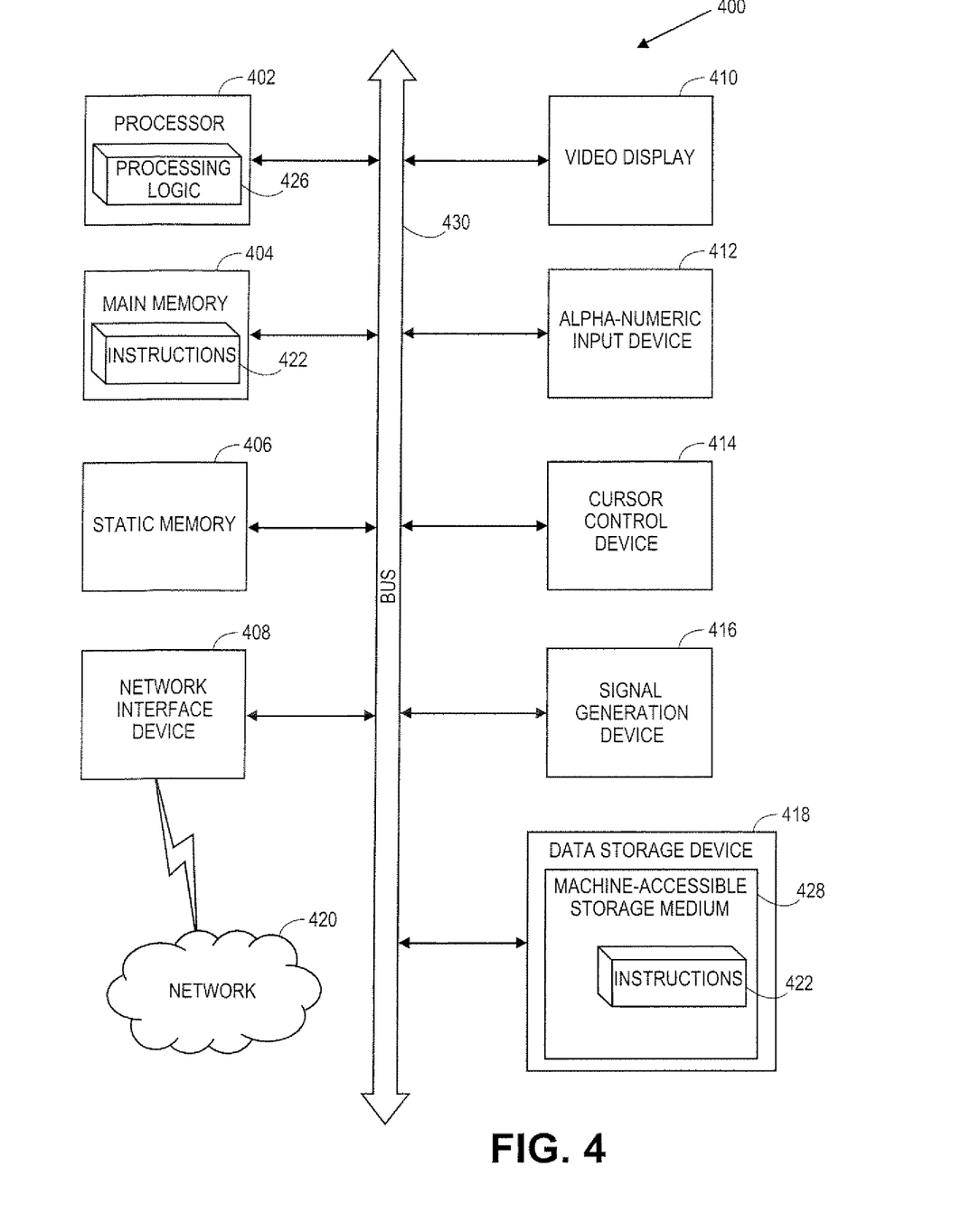
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to implement method 100 to provide real-time audio-based financial information described with respect to FIG. 1, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    receiving, by a financial information endpoint of a media server executed by a processing device, a trigger event related to a financial asset from a user, wherein the financial information endpoint receives financial data associated with the financial asset;
    contacting the user via a phone call;
    announcing, by an Interactive Voice Response (IVR) endpoint of the media server to the user via the phone call, a quantitative representation of the financial asset when the trigger event occurred;
    playing, by a signal generator of the media server, an audio signal to the user, wherein the audio signal establishes a baseline for the financial asset, the baseline corresponding to the quantitative representation of the financial asset;
    in response to the financial asset increasing above the quantitative representation of the financial asset represented by the baseline, increasing, by the signal generator, a combination of a sound volume and a frequency of the audio signal to correlate to a deviation of the financial asset from the quantitative representation of the financial asset; and
    in response to the financial asset decreasing below the quantitative representation of the financial asset represented by the baseline, decreasing, by the signal generator, the combination of the sound volume and the frequency of the audio signal to correlate to the deviation of the financial asset from the quantitative representation of the financial asset;
    wherein the media server comprises an integrated Java™ Enterprise Edition (JAVA EE) application server and media server deployed in the same Java™ virtual machine (JVM), and wherein the media server and JAVA EE application server share a Java™ Management Extensions (JMX) common microkernel architecture.

2. The method of claim 1, wherein a financial information application and the financial information endpoint work in tandem to perform the receiving, the contacting, the announcing, the playing the audio signal, the increasing, and the decreasing.

3. The method of claim 2, wherein the financial information application is hosted by the media server.

4. The method of claim 1, further comprising obtaining information from an integrated financial platform, the information related to the deviation of the financial asset from the quantitative representation of the financial asset.

5. The method of claim 1, wherein the audio signal is a series of intermittent tones and a time interval length between the intermittent tones further indicates the deviation of the financial asset from the quantitative representation of the financial asset.

6. The method of claim 1, further comprising:
    receiving a command from the user via the phone call, the command indicating an action to take related to the financial asset; and
    taking the indicated action on the financial asset in view of the received command.

7. The method of claim 1, wherein the quantitative representation of the financial asset comprises a stock price of the financial asset when the trigger event occurred.

8. A system, comprising:
    a memory;
    a signal generator;
    a communications interface;
    a processing device coupled to the memory, the signal generator, and the communications interface, the processing device to:
        receive a trigger event related to a financial asset from a user;
        instruct the communications interface to contact the user via a phone call;
        play an announcement to the user via the phone call, the announcement explaining the trigger event and comprising a quantitative representation of the financial asset when the trigger event occurred;
        instruct the signal generator to play an audio signal to the user, wherein the audio signal establishes a baseline for the financial asset, the baseline corresponding to the quantitative representation of the financial asset;
        in response to the financial asset increasing above the quantitative representation of the financial asset represented by the baseline, increasing, by the processing device, a combination of a sound volume and a frequency of the audio signal to correlate to a deviation of the financial asset from the quantitative representation of the financial asset; and
        in response to the financial asset decreasing below the quantitative representation of the financial asset represented by the baseline, decreasing, by the processing device, the combination of the sound volume and the frequency of the audio signal to correlate to the deviation of the financial asset from the quantitative representation of the financial asset;

wherein the system is an integrated Java™ Enterprise Edition (JAVA EE) application server and media server deployed in a same Java™ virtual machine (JVM), and wherein the media server and JAVA EE application server share a Java™ Management Extensions (JMX) common microkernel architecture.

9. The system of claim 8, wherein the integrated JAVA Enterprise Edition (JAVA EE) application server and media server comprise a financial information application and a financial information endpoint.

10. The system of claim 8, wherein the audio signal is a series of intermittent tones and a time interval length between the intermittent tones further indicates the deviation of the financial asset from the quantitative representation of the financial asset.

11. The system of claim 8, wherein the processing device is further to:

receive a command from the user via the phone call, the command indicating an action to take related to the financial asset; and take the indicated action on the financial asset in view of the received command.

12. The system of claim 8, wherein the processing device is further to obtain information from an integrated financial platform, the information related to the deviation of the financial asset from the quantitative representation of the financial asset.

13. A non-transitory machine-readable storage medium including instructions that, when accessed by a processing device, cause the processing device to perform operations comprising:

receiving, by a financial information endpoint of a media server executed by the processing device, a trigger event related to a financial asset from a user, wherein the financial information endpoint receives financial data associated with the financial asset;

contacting, by the processing device, the user via a phone call;

playing, by an Interactive Voice Response (IVR) endpoint of the media server to the user via the phone call, an announcement to the user, the announcement explaining the trigger event and indicating a quantitative representation of the financial asset when the trigger event occurred;

playing, by a signal generator of the media server, an audio signal to the user, wherein the audio signal establishes a baseline for the financial asset, the baseline corresponding to the quantitative representation of the financial asset;

in response to the financial asset increasing above the quantitative representation of the financial asset represented by the baseline, increasing, by the signal generator, a combination of a sound volume and a frequency of the audio signal to correlate to a deviation of the financial asset from the quantitative representation of the financial asset; and in response to the financial asset decreasing below the quantitative representation of the financial asset represented by the baseline, decreasing, by the signal generator, the combination of the sound volume and the frequency of the audio signal to correlate to the deviation of the financial asset from the quantitative representation of the financial asset;

receiving, by the processing device, a command from the user via the phone call, the command indicating an action to take related to the financial asset; and taking, by the processing device, the indicated action on the financial asset in view of the received command;

wherein the media server comprises an integrated Java™ Enterprise Edition (JAVA EE) application server and media server deployed in the same Java™ virtual machine (JVM), and wherein the media server and JAVA EE application server share a Java™ Management Extensions (JMX) common microkernel architecture.

14. The non-transitory machine-readable storage medium of claim 13, wherein a financial information application and a financial information endpoint work in tandem to perform the receiving, contacting, playing the announcement, and playing the audio signal.

15. The non-transitory machine-readable storage medium of claim 13, wherein the audio signal is a series of intermittent tones and a time interval length between the intermittent tones further indicates the deviation of the quantitative representation of the financial asset from the trigger event.

16. The non-transitory machine-readable storage medium of claim 13, wherein the operations further comprise obtaining information from an integrated financial platform, the information related to the deviation of the financial asset from the quantitative representation of the financial asset.

* * * * *